INVENTOR
Wilfred R. Reichenstein young# United States Patent Office 3,424,009
Patented Jan. 28, 1969

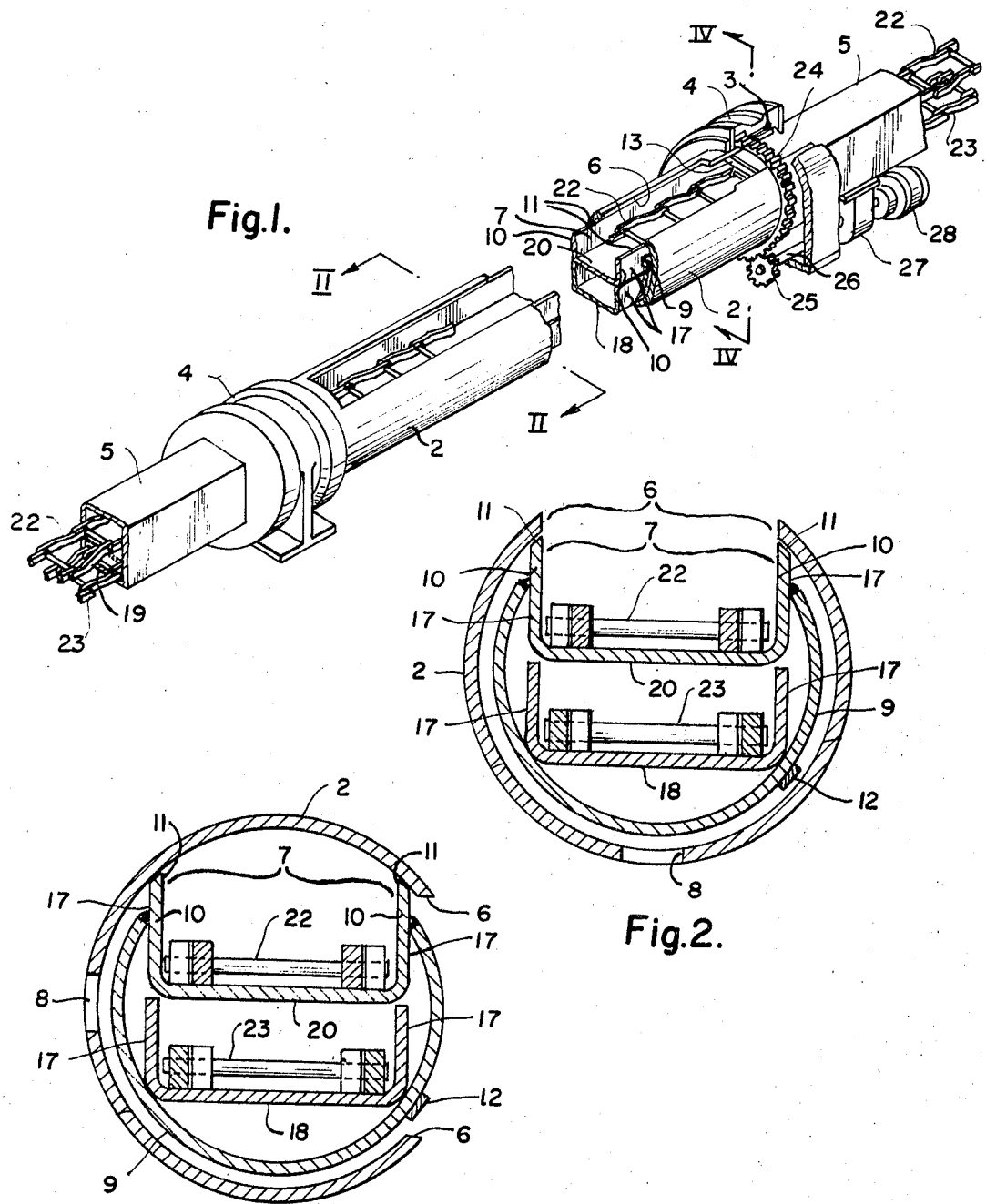

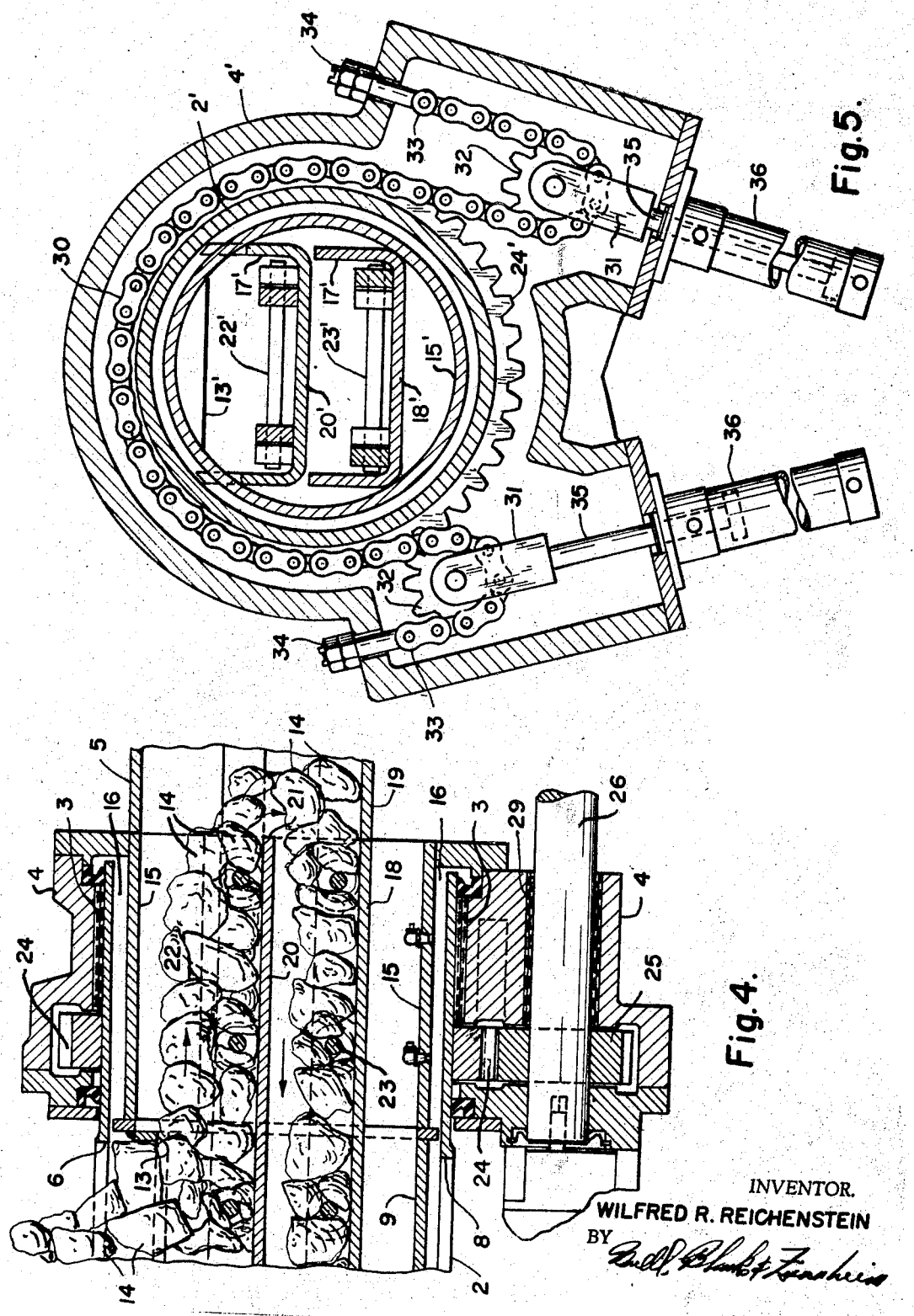

3,424,009
AUTOMATIC SAMPLE COLLECTORS
Wilfred R. Reichenstein, Marion, Ohio, assignor to The Fairfield Engineering Company, a corporation of Ohio
Filed Dec. 8, 1966, Ser. No. 600,171
U.S. Cl. 73—424        10 Claims
Int. Cl. G01n 1/00

ABSTRACT OF THE DISCLOSURE

An apparatus for automatically extracting samples of convenient bulk from a body of solid particulate material, which has at least one tubular member with a receiving opening, and has at least one substantially rigid member with a shearing edge and at least one inner closure member within each tubular member. To obtain a sample, a tubular member and rigid member are imparted with a relative rotational motion thereby cutting off the ingress of the material through the receiving opening by their coaction, and an inner closure member is positioned to substantially block the ingress of the material through the receiving opening thereafter.

---

This invention relates to automatic sample collectors which are used to extract samples from a body of fungible material for separate analysis and testing of the samples. It is particularly useful in extracting samples from a body of fungibles composed of relatively solid particulates such as coal or ore.

The use of automatic sample collectors to obtain samples from large bodies of fungibles for analysis and testing is broadly old and well known. They provide the industrial consumer with representative samples from which he can evaluate the quality of goods received and make more complete and efficient use of them. For example, a consumer can evaluate the moisture content of coal to be used in a boiler plant so that the flues can be adjusted from time to time or the coal pre-dried for more efficient use, or he can evaluate the ash content and thereby determine the heating quality of coal received. The ultimate problem in sample collecting, therefore, is to obtain the most representative samples of an accurately predicable and convenient bulk in the most economical, orderly and simple fashion.

In sampling relatively solid particulate materials such as coal or ore, it was previously necessary that the samples be large to achieve representativeness and accurately predicable bulk. For example, a gross sample of particulates taken from beneath the head pulley of a belt conveyor carrying 5,000 tons per hour with an "across the belt" type sampler would necessarily weigh thousands of pounds. Such a bulky sample was inconvenient to handle and could not be efficiently analyzed, and in turn, impeded the frequency at which samples could be taken and still remain commercially feasible. One way of overcoming these difficulties was to preprocess the material to break the particulates into smaller pieces so that smaller, more convenient representative samples could be obtained. But such preprocessing apparatus were in general clumsy, impractical and expensive, and could not be used for such purposes as the sampling of a flow of particulates from a gondola type railroad car or a flow of particulates from beneath the head pulley of a large capacity belt conveyor where sufficient space was not available for preprocessing machinery.

One of the most commonly used sample collectors heretofore was simply a rotatable cylindrical member with an opening therein. It had the inherent advantage of obtaining samples of convenient bulk for handling and separate analysis. This cylindrical member could be placed in a flow of fungible materials and by rotating it, samples collected within it, and then removed from the interior of the cylindrical member and the flow of material by conveying means or gravity; or the flow of fungible materials could be directed through the cylindrical member, and by rotating it, samples could be collected beneath it. In either case, this type of collector was not useable when the fungible materials were composed of relatively solid particulates such as coal or ore, for the particulates of material would not evenly flow into or out of the cylindrical member and in turn samples of predicable bulk could not be obtained. Moreover, the particulates could obstruct the opening in the cylindrical member and in turn impede or stop the rotation of the cylindrical member. To overcome these difficulties, such material could be preprocessed to break up the particulates and a means provided to uniformly feed the material around or through the cylindrical member. This alternative, however, was subject to the broad objections as stated above.

The present invention overcomes these disadvantages and makes the direct sampling of a body of fungibles composed of relatively solid particulates commercially feasible without requiring large burdensome samples, utilizing the basic rotary tubular type sample collector.

I provide a sample collector for the direct sampling of particulate solid material. The sample collector is comprised of at least one tubular member preferably of a cylindrical shape. Each tubular member has at least one sample receiving opening therein to receive said material when each said receiving opening is facing substantially counter to the direction of flow or potential movement of said material. Each said receiving opening in each tubular member can be of any suitable size, provided it is adequate to prevent bridging or blinding by the particulates; generally each said receiving opening must be at least two and one-half (2½) to three (3) times the diameter of the largest particulates. At least one substantially rigid member, preferably a trussed flange, is positioned within each tubular member. Each said rigid member has a shearing edge thereon adjacent to the inner surface of the tubular member and near an edge of each said receiving opening in the tubular member, whereby the ingress of said material into the tubular member through each said receiving opening is cutoff by coaction of the tubular member and the shearing edge of the rigid member when they are imparted with a relative rotational motion irrespective of where the particulates of said material hapepn to be relative to each said receiving opening in the tubular member at the time. At least one inner closure member, preferably one inner cylindrical member, is positioned within each tubular member to substantially block each said receiving opening in each tubular member after the ingress of said material is cutoff by the coaction of the tubular member and the shearing edge of each rigid member. Power means are provided to impart the relative rotational motion between the tubular member and the rigid member, and conveying means are provided to remove the sampled material from the interior of the tubular member and the interior of said material. Each sample collector can be of any desired length, depending on the size of the sample desired, the particulate characteristics, geometry and dynamics of the material to be sampled, and the number of sample collectors to be used together.

Preferably, each said inner closure member of each tubular member is not positioned in close proximity to or in contact with the tubular member to prevent binding between it and the tubular member when the tubular member and each said rigid member are imparted with a relative rotational motion. And each tubular member is provided with a relief opening or openings substantially opposite and substantially 180 degrees from said receiving openings and corresponding to each inner closure member to provide relief for any particulates which become trapped between the tubular member and each inner closure member.

In a preferred embodiment each tubular member is rotatable and each rigid member is stationary. The ingress of said material is provided by rotating each tubular member to open position, where each receiving opening therein is facing substantially counter to the direction of flow or potential movement of said material. The ingress of said material is cut off by rotating each tubular member to closed position, where each receiving opening therein is facing substantially across the direction of flow or potential flow of said material and substantially 90 degrees in either direction from the open position. Thus the rotational motion can be entirely rotatory in one direction or the other, or reciprocal in one quadrant or another, depending upon the positioning of each said rigid member and each said inner closure member within each tubular member. Further, the rotational motion can be imparted to each tubular member independently or in unison with other tubular members.

In another preferred embodiment each tubular member is cylindrical in shape and provided with teeth round at least one end of its outer circumference, i.e., the teeth can be positioned either all the way or part way along the outer circumference depending on whether the rotation of each tubular member is rotatory or reciprocal. At least one gear member, preferably a pinion gear, is positioned to engage the teeth round the tubular member, each gear member being rigidly fixed to a shaft. Each shaft is in turn connected through a suitable gear box to a suitable electric motor, which may or may not be reversible, and is supported by bearing means. By this arrangement each tubular member is provided with a rotational motion to move it to the opened and closed positions quickly and with a relatively large torque.

As an alternative preferred embodiment each tubular member is cylindrical in shape and provided with sprocket teeth round at least one end of its outer circumference. A chain or chains extends round each tubular member engaging the teeth therein, and extends through yokes provided on each side of the tubular member engaging a sprocket supported in each yoke, and dead ends at each side of the tubular member. Each yoke is rigidly attached to the end of hydraulic piston and has a reciprocating motion substantially in the plane of the chain, which is imparted by a hydraulic power system. By this arrangement the reciprocating motion is translated to a rotational motion moving the tubular member to the opened and closed positions quickly and with a relatively large torque.

In still another preferred embodiment the power source is provided with a timing means to automatically and sequentially impart the relative rotational motion between the tubular members and the rigid members. If each tubular member is rotated and each rigid member held stationary, the timing means can be implemented by providing gearing means to impart the desired number of revolutions to the tubular members, each revolution providing a sample of said material. Or, the timing means can be implemented by providing a control source to impart reciprocating rotational motion to the tubular members. For example, in the preferred embodiments of the power means above described, the electric motor can be reversible and provided with an electrical switch and timer; or the hydraulic power system can be provided with a valve, servo-mechanism and electric timer.

In a further preferred embodiment the end portion of each tubular member through which the sampled material is removed has an orifice member positioned within it. As the sampled material is conveyed away, the orifice member serves to restrict the cross-sectional area of said sampled material to allow more convenient conveyance of it, and also break the particulate material into smaller particulates thereby relieving the internal compression forces within the sampled material which occurs after the ingress of said material into each tubular member is cut-off. Preferably, a duct member, preferably of a cylindrical shape, is positioned to give the orifice member support. The duct member does not extend into the interior of each tubular member as far as the orifice member, thereby stopping the restricted sampled material from binding between the duct member and the floor of the conveying means and in turn jamming the conveying means. If, as previously preferred, each tubular member is provided with only one inner closure member of a cylindrical shape, the duct member can be made as an integral part of the inner closure member. It is also preferred that an orifice member and duct member be provided on both end portions of each tubular member and form annular cavities with the tubular member. Into these annular cavities is placed grease to form seals and thereby stop particulates of the sampled material from entering the bearing means by which each rotatable tubular member is supported. Further, the symmetrical arrangement allows for more universal use of each assembled element of a sample collector as said sampled material can be removed from either end of the assembled element with equal ease.

In a still further preferred embodiment a frame having two levels is provided within each tubular member, the lower level aligning with the floor of the housing of the conveying means and the upper level being open ended and having the return flight of the conveying means passing over it. The sampled material deposited on the upper level is pushed off the end of the upper level to the lower level and from there conveyed away. By this arrangement the sampled material is expeditiously removed from the area of ingress to make ready for the taking of another sample.

Other details, objects and advantages of my invention will become apparent as the following description of the presently preferred embodiments thereof proceed.

In the accompanying drawing, I illustrated presently preferred embodiments of my invention in which:

FIGURE 1 is a perspective view with portions broken away of an assembled sample collector;

FIGURE 2 is an enlarged transverse cross-sectional view taken along line II—II of FIGURE 1 and showing a sample collector in open position;

FIGURE 3 is an enlarged transverse cross-sectional view corresponding to FIGURE 2 and showing a sample collector in closed position;

FIGURE 4 is an enlarged partial axial cross-sectional view taken on the line IV—IV of FIGURE 1 of a sample collector;

FIGURE 5 is an enlarged transverse cross-sectional view of an assembled sample collector showing an alternative drive means;

FIGURE 7 is a top view of FIGURE 6 showing a series of sample collectors arranged to adequately sample the falling coal, ore or the like.

Figure 7:
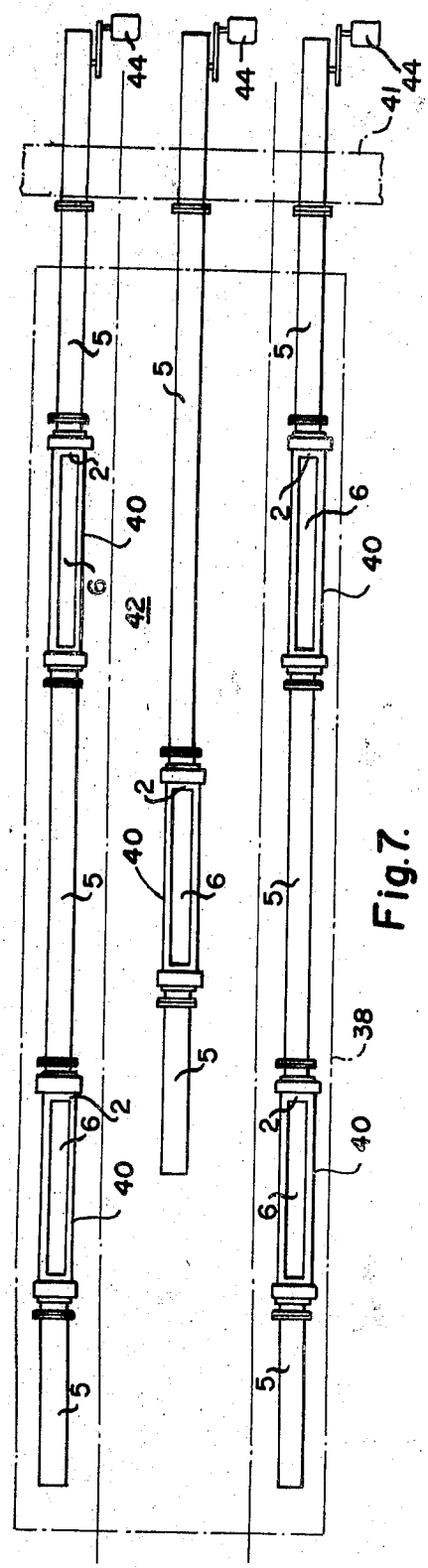
Figure 6:
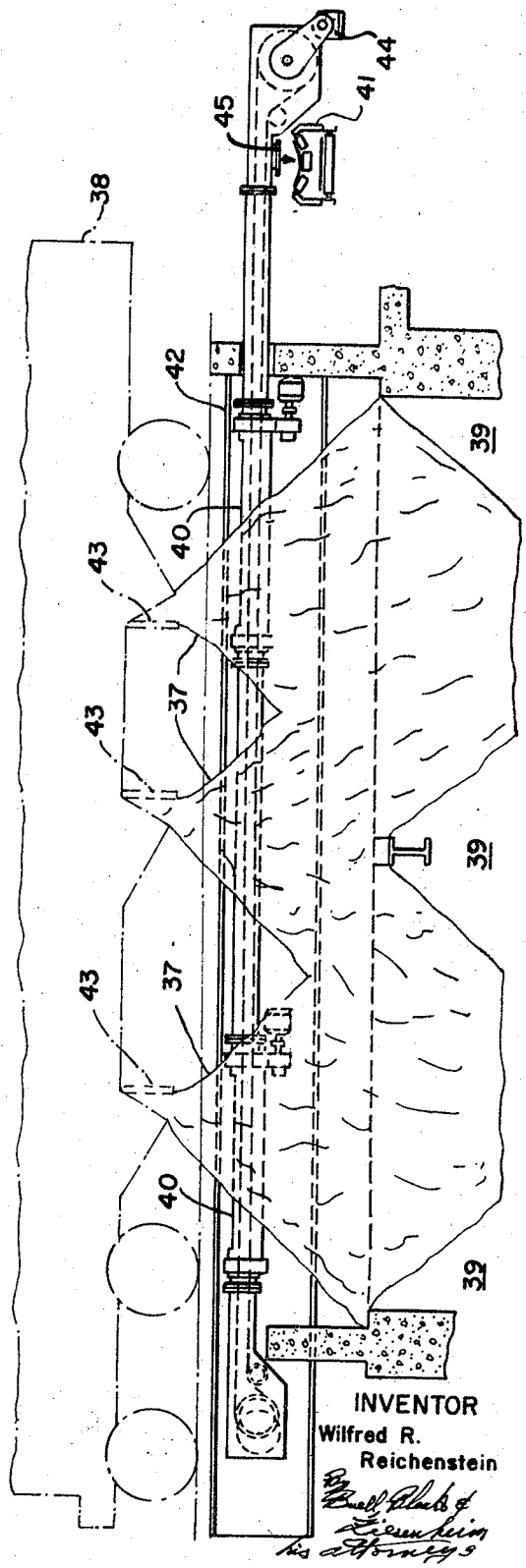
FIGURE 6 is a side view of a series of sample collectors in use for sampling coal, ore or the like, flowing from a gondola car directly into a track hopper.

A sample collector is comprised of at least one rotatable tubular member 2 which is supported by bearings 3, the bearings 3 being seated in the housings 4 which are rigidly attached to and at least in part supported by the conveyor housings 5. Each tubular member 2 has a slot shaped receiving opening 6 therein which aligns with opening 7 in the upper level 20 of the frame 17 when the tubular member 2 is in open position and has relief openings 8 to provide relief for any particulates which become trapped between the tubular member 2 and inner closure member 9. Within each tubular member 2 are rigid members 10 having shearing edges 11 which coact with the tubular member 2 to cutoff the ingress of material into the collector when the tubular member 2 is rotated from open to closed position, irrespective of how the particulates happen to be positioned astride the receiving opening 6 in the tubular member 2. Each rigid member 10 is trussed by an inner closure member 9 which is cylindrical in shape and is rigidly attached to and at least in part supported by the conveyor housing 5. The inner closure member 9 also functions as a barrier to substantially block the receiving opening 6 in each tubular member 2 after the ingress of said material is cutoff by rotation of the tubular member 2 to closed position. Further, the inner closure member is fixed with a deflection bar 12 to deflect falling particulates and thereby discourage their entry through the receiving opening 6 into the annular cavity between the tubular member 2 and the inner closure member 9, when the tubular member 2 is in closed position.

Preferably the end portions of the tubular member 2 have orifice members 13 positioned within it to restrict the cross-sectional area of said sampled material 14 to allow more convenient conveyance of it, and also relieve the internal compression forces within the sampled material 14 by breaking the sampled particulates into smaller particulates. Duct members 15, which are an integral part of the inner closure member 9, are positioned to give the orifice members 13 truss support. Annular cavities 16 are formed by the orifice members 13, the duct members 15, and the tubular member 2 in which grease is put to form a seal and thereby stop particulates of the sampled material 14 from entering the bearings 3. Also within the tubular member 2 is a frame 17 which is rigidly attached to conveyor housing 5, having two levels, the lower level 18 aligning with the floor 19 of the conveyor housing 5, and the upper level 20 being open ended at 21 and having the return flight 22 of the conveyor 23 passing over it. This arrangement allows the sampled material 14 deposited on the upper level 20 to be pushed off of the end 21 by the flight 22 to the lower level 18 and from there conveyed away by the conveyor 23. The frame 17 is an integral part of rigid members 10 and the shearing edges 11.

Preferably, each tubular member 2 is powered by providing teeth 24 round one end of its outer circumference. A pinion gear 25 is positioned to engage the teeth 24 in the tubular member 2, and rigidly fixed to a shaft 26. Each is in turn connected through a suitable gear box 27 to a suitable electric motor 28, and is supported by bearing means 29 which are seated in the housing 4. By this arrangement each tubular member is powered to open and closed positions quickly and with a relatively large torque.

In an alternative embodiment, the tubular member 2' is provided with sprocket teeth 24' round one end of its outer circumference. A chain 30 is extended round each tubular member 2' engaging the teeth 24' therein, and extends through a yoke 31 provided on each side of the tubular member 2' engaging a sprocket 32 supported in each yoke 31, and dead ends at 33 by suitable fastening means 34 on the housing 4'. Fastening means 34 are capable of minute adjustment to vary the open and closed positions of the tubular member 2'. Each yoke 31 is rigidly attached to the end of a hydraulic piston 35, the hydraulic cylinder 36 being rigidly attached to and supported by the housing 4'. All other parts are the same as above described and are indicated by fixing a prime thereto.

My invention is particularly useful in collecting samples of particulate material 37, being discharged from the hopper doors 43 of gondola type railroad cars 38 directly into a track hopper 39. A plurality of five sample collectors 40 are positioned to adequately sample material 37 from all portions of the flow. The material 37 composing the sample enters the sample collector 40 through receiving opening 6. Thereafter, the sampled material is conveyed away from the sample collector 40 through a plurality of conveyor housings 5 by a power means 44 and discharged at 45 into a trunk conveyor 41 which in turn carries the sample away for analysis and testing.

Because of the compactness and durability of the sample collectors assembly, they can be positioned underneath the track hopper grating 42 and directly under the hopper doors 43 of the gondola car 38. The lengths of individual sample collectors 40 are suitably designed to accommodate railroad cars of varying capacities and hopper doors of varying number and at varying positions. Further, by timing the "cuts" taken by the sample collectors 40, representative samples from different vertical layers of the material 37 in the gondola car 38 can be obtained. By this assemblage a minimum of sample collector elements 40 can adequately and automatically monitor a falling stream of material 37 from the entire gondola car 38.

While I have shown and described certain present preferred embodiments and uses of the invention, it is to be distinctly understood that the invention is not limited thereto but may be otherwise variously embodied and used within the scope of the following claims.

I claim:
1. A sample collector for sampling solid particulate material comprising at least one tubular member positioned to be in said material, each tubular member having at least one receiving opening therein to receive said material into the tubular member when the opening is facing substantially counter to the direction of movement of said material, at least one substantially rigid member within each tubular member having a shearing edge thereon whereby the ingress of said material is cutoff by the coaction of the tubular member and the shearing edge of each said rigid member when they are imparted with a relative rotational motion, at least one inner closure member positioned within each tubular member to substantially block each said receiving opening in each tubular member after the ingress of said material is cutoff by the coaction of the tubular member and the shearing edge of the rigid member, power means to impart the relative rotational motion between the tubular member and the rigid member, and conveying means to remove sampled material from the interior of the tubular member and said material.

2. A sample collector for sampling solid particulate material comprising at least one rotatable tubular member positioned to be in said material, each tubular member having at least one receiving opening therein to receive said material into the tubular member when the tubular member is rotated to open position, at least one substantially rigid member within each tubular member having a shearing edge thereon whereby the ingress of said material can be cutoff by the coaction of the tubular member and the shearing edge of the rigid member when the tubular member is rotated from open to closed position, at least one inner closure member to substantially block each said receiving opening in each tubular member when each tubular member is in closed position, a power means to rotate each tubular member to open and closed positions, and conveying means to remove sampled material from the interior of the tubular member and said material.

3. A sample collector for sampling solid particulate material as claimed in claim 1 wherein each tubular member is cylindrically shaped.

4. A sample collector for sampling a flow of particulate solid material as claimed in claim 1 which comprises in addition a timing means to provide automatic sequential rotation of each tubular member to open and closed poitions.

5. A sample collector for sampling a flow of particulate solid material as claimed in claim 1 which comprises in addition a moving means capable of quickly removing sampled material from the area of ingress of said material into each tubular member.

6. A sample collector for sampling a flow of particulate solid material as claimed in claim 2 wherein the power means is provided by having teeth positioned round at least one end of the outer circumference of the tubular member of a cylindrical shape, a chain extending round at least one end of each tubular member and engaging the teeth thereon, each chain extending through yokes on each side of the tubular member and engaging a sprocket supported in each yoke and dead-ending by suitable fastening means on a housing on each side of the tubular member, each yoke being capable of a reciprocating motion substantially in the plane of said chain provided by a hydraulic power source, whereby the reciprocating motion of the power source is translated to a rotational motion moving each tubular member to open and closed positions.

7. A sample collector for sampling a flow of particulate solid material as claimed in claim 2 wherein the power means is provided by having teeth positioned round at least one end of the outer circumference of the tubular member of a cylindrical shape, at least one gear member engaging the teeth round the tubular member, each gear member being rigidly fixed to a shaft, each shaft being connected through to an electric power source and supported by bearing means whereby each tubular member is moved to open and closed positions.

8. A sample collector for sampling solid particulate material as claimed in claim 2 which comprises in addition at least one orifice member positioned in an end portion of each tubular member to restrict the cross-sectional area of sampled material as it is removed from each tubular member and to break said particulate material into smaller particulates.

9. A sample collector for sampling solid particulate material as claimed in claim 8 which comprises in addition a duct member to give truss support to each orifice member and form at least one annular cavity with the said orifice member and each tubular member wherein grease is put to seal bearing means for each rotatable tubular member from sampled material.

10. A sample collector for sampling solid particulate material as claimed in claim 1 wherein each tubular member has at least one relief opening substantially opposite the said receiving opening to provide relief for particulates trapped between each tubular member and the said inner closure member.

References Cited
UNITED STATES PATENTS

| | | | |
|---|---|---|---|
| 1,448,758 | 3/1923 | Martin | 73—424 |
| 3,348,419 | 12/1964 | Addison | 73—424 |

LOUIS R. PRINCE, *Primary Examiner.*

H. C. POST, *Assistant Examiner.*